United States Patent

Hsu et al.

[11] Patent Number: 5,300,599
[45] Date of Patent: Apr. 5, 1994

[54] MODIFIER FOR ANIONIC POLYMERIZATION OF DIENE MONOMERS

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 43,712

[22] Filed: Apr. 8, 1993

Related U.S. Application Data

[63] Continuation-in-part of Ser. No. 864,264, Apr. 6, 1992, Pat. No. 5,231,153.

[51] Int. Cl.$^5$ .................................................. C08F 4/48
[52] U.S. Cl. .................................. 502/154; 502/156; 502/157; 502/171; 526/174; 526/175; 526/181; 526/183
[58] Field of Search ............... 526/181, 174, 175, 183, 526/340.2; 502/154, 156, 157, 171

[56] References Cited

U.S. PATENT DOCUMENTS

| | | | |
|---|---|---|---|
| 3,703,566 | 11/1972 | Duck et al. | 525/250 |
| 3,847,883 | 11/1974 | Kamienski et al. | 260/83.7 |
| 4,367,325 | 1/1983 | Takeuchi et al. | 526/340 |
| 4,429,090 | 1/1984 | Hall et al. | 526/177 |
| 4,429,091 | 1/1984 | Hall | 526/181 |
| 4,647,635 | 3/1987 | Hall | 526/181 |
| 4,696,986 | 9/1987 | Halasa et al. | 526/181 |
| 4,761,456 | 8/1988 | Lund et al. | 525/250 |
| 4,933,401 | 6/1990 | Hattori et al. | 526/181 X |
| 5,086,136 | 2/1992 | Takashima et al. | 526/177 |

FOREIGN PATENT DOCUMENTS

1131885  12/1984  U.S.S.R. .................. 526/181

OTHER PUBLICATIONS

Hackh's Chemical Dictionary (4th ed.) McGraw-Hill Book Co., N.Y., p. 286 (1969).
Morita et al., JACS, 79, 5853 (1957).
Patent Application Serial No. 07/864,264, filed Apr. 6, 1992.

*Primary Examiner*—Fred Teskin
*Attorney, Agent, or Firm*—Alvin T. Rockhill

[57] ABSTRACT

It has been unexpectedly discovered that salts of tetrahydrofurfuryl alcohols, such as the lithium, potassium, and sodium salts of tetrahydrofuryl alcohols, can be used to modify anionic polymerizations of conjugated diene monomers. These modifiers can be used to polymerize isoprene monomer into polyisoprene having from 20% to 30% 1,2-microstructure at excellent polymerization rates. This invention more specifically discloses a catalyst system which is particularly useful in the anionic polymerization of conjugated diene monomers into polymers which is comprised of (a) a initiator which is selected from the group consisting of organolithium compounds, organosodium compounds, organopotassium compounds, organomagnesium compounds, and organobarium compounds, and (b) a modifier which is a metal salt of a tetrahydrofurfuryl alcohol. The subject invention further discloses a process for the synthesis of a rubbery polymer which comprises polymerizing (1) from about 50 weight percent to 100 weight percent conjugated diene monomers and (2) from 0 weight percent to about 50 weight percent monomers which are copolymerizable or terpolymerized with said conjugated diene monomers, in an inert organic solvent in the presence of a catalyst system which is comprised of (a) an initiator selected from the group consisting of organolithium compounds, organosodium compounds, organomagnesium compounds, and organobarium compounds, and (b) a modifier which is a metal salt of a tetrahydrofurfuryl alcohol or a metal salt of a substituted tetrahydrofurfuryl alcohol.

10 Claims, No Drawings

MODIFIER FOR ANIONIC POLYMERIZATION OF DIENE MONOMERS

This is a continuation-in-part application of U.S. patent application Ser. No. 07/864,264, filed on Apr. 6, 1992 now U.S. Pat. No. 5,231,153.

BACKGROUND OF THE INVENTION

It is important for polydienes which are used in many applications to have high vinyl contents. For example, 3,4-polyisoprene can be used in tire tread compounds to improve tire performance characteristics, such as traction. Polar modifiers are commonly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. U.S. Pat. No. 4,696,986 describes the use of 1,2,3-trialkoxybenzenes and 1,2,4-trialkoxybenzenes as modifiers. The vinyl group content of polydienes prepared utilizing Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints; Vol. 7 (1), 132 [1966]). For this reason it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. However, it has traditionally been difficult to prepare polymers having high vinyl contents at temperatures which are high enough to attain maximum polymerization rates while utilizing conventional Lewis bases as modifiers.

U.S. Pat. No. 5,231,153, filed on Apr. 6, 1992 discloses that compounds having the following structural formulae can be used as modifiers in the synthesis of polydienes:

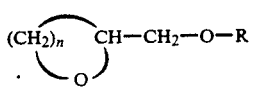  (i)

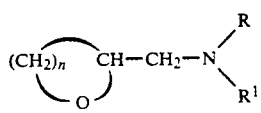  (ii)

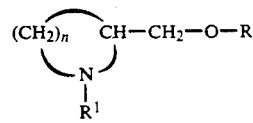  (iii)

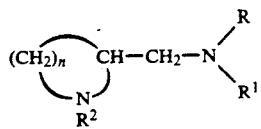  (iv)

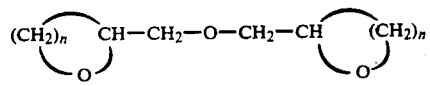  (v)

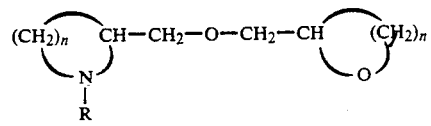  (vi)

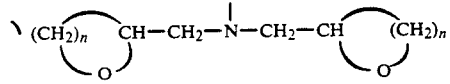  (vii)

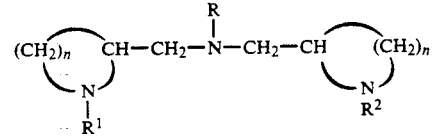  (viii)

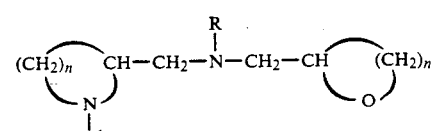  (ix)

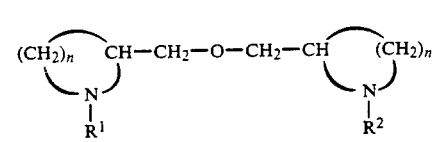  (x)

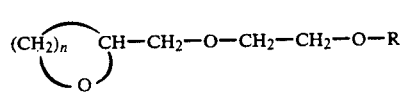  (xi)

wherein n represents an integer within the range of 3 to 6, and wherein R, $R^1$, and $R^2$ can be the same or different and represent alkyl groups containing from 1 to 10 carbon atoms, aryl groups containing from 6 to 10 carbon atoms, or hydrogen atoms.

SUMMARY OF THE INVENTION

It has been unexpectedly found that salts of tetrahydrofurfuryl alcohols and salts of substituted tetrahydrofurfuryl alcohols can be utilized to modify the anionic polymerization of conjugated diene monomers into polymers. By employing these modifiers polyisoprene having about 12% to about 30% 1,2-microstructure can be synthesized by anionic polymerization. For example, polyisoprenes which are very useful in tire tread compounds having about 20% to about 30% 1,2-microstructure can be made by this technique. Such polymerizations are normally conducted using an initiator selected from the group consisting of organolithium compounds, organosodium compounds, organomagnesium compounds, and organobarium compounds. The tetrahydrofurfuryl alcohol salts which can be used are normally lithium, sodium, or potassium salts.

This invention more specifically discloses a catalyst system which is particularly useful in the anionic polymerization of conjugated diene monomers into polymers which is comprised of (a) an initiator which is selected from the group consisting of organolithium compounds, organosodium compounds, organopotassium compounds, organomagnesium compounds, and organobarium compounds, and (b) a modifier which is selected from the group consisting of metal salts of a tetrahydrofurfuryl alcohols and metal salts of substituted tetrahydrofurfuryl alcohols.

The subject invention further discloses a process for the synthesis of a rubbery polymer which comprises polymerizing (1) from about 50 weight percent to 100 weight percent conjugated diene monomers and (2) from 0 weight percent to about 50 weight percent monomers which are copolymerizable or terpolymerized with said conjugated diene monomers, in an inert organic solvent in the presence of a catalyst system which is comprised of (a) an initiator selected from the group consisting of organolithium compounds, organosodium compounds, organomagnesium compounds, and organobarium compounds, and (b) a modifier which is selected from the group consisting of metal salts of a tetrahydrofurfuryl alcohols and metal salts of substituted tetrahydrofurfuryl alcohols.

The subject invention also reveals a process for the synthesis of a rubbery polymer which comprises adding (a) an organolithium compound and (b) an alcohol selected from the group consisting of (i) alcohols having the structural formula:

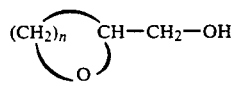

wherein n represents an integer within the range of 3 to 6, (ii) substituted alcohols having the structural formula:

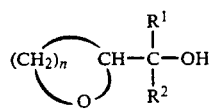

wherein n represents an integer within the range of 3 to 6, and wherein $R^1$ and $R^2$ can be the same of different and represent alkyl groups containing from 1 to about 10 carbon atoms or hydrogen atoms, and (iii) substituted alcohols having the structural formula:

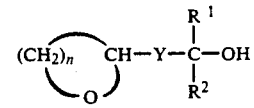

wherein n represents an integer within the range of 3 to 6, wherein $R^1$ and $R^2$ can be the same of different and represent alkyl groups containing from 1 to about 10 carbon atoms or hydrogen atoms, and wherein Y represents an alkylene group containing from 1 to about 10 carbon atoms; to a polymerization medium containing at least one conjugated diene monomer and an inert organic solvent. By utilizing this technique the modifier is made "insitu" in the polymerization medium by the reaction of the alcohol with the organolithium initiator. In other words a salt of the alcohol or substituted alcohol is formed.

The polyisoprenes which can be made by utilizing the techniques of this invention generally contain from about 12% to about 30% 1,2-microstructure, from about 45% to about 70% 3,4-microstructure, and from about 15% to about 40% 1,4-microstructure. These polyisoprene rubbers preferably contain from about 20% to about 30% 1,2-microstructure.

DETAILED DESCRIPTION OF THE INVENTION

The polymers which can be prepared utilizing the tetrahydrofurfuryl alcohol salts of the present invention as modifiers are normally organolithium-initiated, vinyl group containing polymers of at least one diolefin monomer which are generally rubbery (elastomeric) polymers. The diolefin monomers utilized in the preparation of such polymers normally contain from 4 to 12 carbon atoms with those containing from 4 to 8 carbon atoms being more commonly utilized. The diolefin monomers used in such polymers are normally conjugated diolefins.

The conjugated diolefin monomers which are utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Copolymers of one or more diolefin monomers having high vinyl contents can also be prepared utilizing the modifiers of the present invention. For instance, copolymers of isoprene and butadiene having high vinyl contents can be synthesized.

Polydiene rubbers having high vinyl contents which are copolymers or terpolymers of diolefin monomers with one or more other ethylenically unsaturated monomers which are copolymerizable with diolefin monomers can also be prepared utilizing the modifiers of this invention. Some representative examples of ethylenically unsaturated monomers that can potentially be synthesized into such high vinyl polymers include alkyl acrylates, such as methyl acrylate, ethyl acrylate, butyl acrylate, methyl methacrylate and the like; vinylidene monomers having one or more terminal $CH_2$-CH- groups; vinyl aromatics such as styrene, α-methylstyrene, bromostyrene, chlorostyrene, fluorostyrene and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; $\alpha,\beta$-olefinically unsaturated nitriles, such as acrylonitrile and methacrylonitrile; $\alpha,\beta$-olefinically unsaturated amides, such as acrylamide, N-methyl acrylamide, N,N-dimethylacrylamide, methacrylamide and the like.

Polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

Vinyl aromatic monomers are probably the most important group of ethylenically unsaturated monomers which are commonly incorporated into polydienes. Such vinyl aromatic monomers are, of course, selected so as to be copolymerizable with the diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

The polymerizations of the present invention which are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. The modifiers of this invention are also useful in bulk polymerizations which are initiated with lithium catalyst systems.

In solution polymerizations which utilize the modifiers of this invention, there will normally be from 5 to 35 weight percent monomers in the polymerization medium. Such polymerization mediums are, of course, comprised of an organic solvent, monomers, an organolithium initiator, and the modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compounded with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl 4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a secor tert-organomonolithium compounded with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The modifiers which can be employed in the synthesis of polydienes having high vinyl contents in accordance with this invention are (1) salts of alcohols have the structural formula:

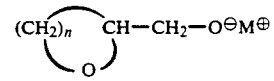

wherein n represents an integer within the range of 3 to 6, and wherein M represents a metal ion and (2) salts of substituted alcohols having the structural formula:

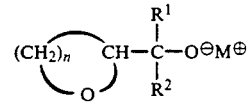

or the structural formula:

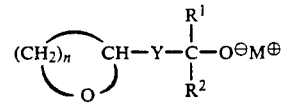

wherein n represents an integer within the range of 3 to 6, wherein M represents a metal ion, wherein $R^1$ and $R^2$ can be the same of different and represent alkyl groups containing from 1 to about 10 carbon atoms or hydrogen atoms, and wherein Y represents an alkylene group containing from 1 to about 10 carbon atoms. As a general rule, n will represent the integer 3 or 4. More commonly n will represent the integer 3. In most cases, M will be a metal selected from the group consisting of lithium, sodium, potassium, rubidium, and cesium. It is preferred for the metal to be lithium, sodium, or potassium. It is generally most preferred for the metal to be lithium. In most cases $R^1$ and $R^2$ will represent a hydrogen atom or an alkyl group containing from 1 to about 4 carbon atoms. Typically, $R^1$ and $R^2$ reprenent hydrogen, an ethyl group, or a methyl group. In most cases Y will represent an alkylene group containing from 1 to about 4 carbon atoms, such as a methylene group or an ethylene group.

For example, tetrahydrofurfuryl alcohol salts can be made by simply reacting a tetrahydrofurfuryl alcohol with an organometallic compound of the formula M-R wherein M represents a metal selected from the group consisting of lithium, sodium, potassium, rubidium, and cesium and wherein R represents an alkyl group. The alkyl group will normally be lithium, sodium, or potassium. In most cases it is preferred for the metal to be lithium. The alkyl group will normally contain from 1 to about 10 carbon atoms.

The alcohols which can be used have the structural formula:

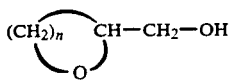

wherein n represents an integer within the range of 3 to 6. As a general rule, n will represent the integer 3 or 4. More commonly n will represent the integer 3.

The substituted alcohols which can be used have the structural formula:

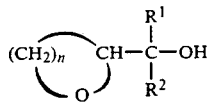

or the structural formula:

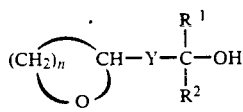

wherein n represents an integer within the range of 3 to 6, wherein $R^1$ and $R^2$ can be the same of different and represent alkyl groups containing from 1 to about 10 carbon atoms or hydrogen atoms, and wherein Y represents an alkylene group containing from 1 to about 10 carbon atoms. As a general rule, n will represent the integer 3 or 4. More commonly n will represent the integer 3. In most cases $R^1$ and $R^2$ will represent a hydrogen atom or an alkyl group containing from 1 to about 4 carbon atoms. Typically, $R^1$ and $R^2$ reprenent hydrogen, an ethyl group, or a methyl group. In most cases Y will represent an alkylene group containing from 1 to about 4 carbon atoms, such as a methylene group or an ethylene group.

One mole of the organometallic compound is reacted with one mole of the alcohol as follows:

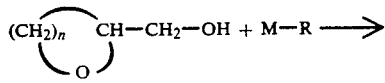

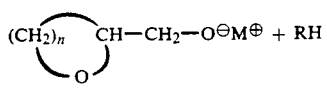

wherein M represents a metal selected from the group consisting of lithium, sodium, potassium, rubidium, and cesium and wherein R represents an alkyl group.

The modifier being utilized can be introduced into the polymerization zone being utilized in any manner. In one embodiment, it can be reacted with the organometallic compound with the reaction mixture therefrom being introduced into the polymerization zone as the initiator. In another embodiment, the modifier can be introduced into the polymerization zone directly without first being reacted with the organometallic compound being utilized as the initiator. In other words, the modifiers can be introduced into the polymerization zone in the form of a reaction mixture with the organometallic initiator or they can be introduced into the polymerization zone separately.

The modifier can also be made in the polymerization zone by a insitu technique. This can be done by simple adding both the organometallic compound and a tetrahydrofurfuryl alcohol to the polymerization medium. For example, an alkyl lithium compound and the tetrahydrofurfuryl alcohol can be added to the polymerization medium. In such cases, the amount of alkyl lithium compound added can be sufficient to both convert the tetrahydrofurfuryl alcohol to a lithium salt and to act as the initiator for the polymerization. The amount of alkyl lithium compound needed as the initiator in such a scenario is increased by one mole for every mole of the tetrahydrofurfuryl alcohol present. This is, of course, because the tetrahydrofurfuryl alcohol reacts with the alkyl lithium compound in producing the salt.

The amount of modifier needed will vary greatly with the vinyl content which is desired for the polymer being synthesized. For instance, polymers with only slightly increased vinyl contents can be prepared by utilizing as little as 0.1 moles of the modifier per mole of metal in the organometallic initiator being utilized. If polymers having very high vinyl contents are desired, then large quantities of the modifier can be used. However, normally there will be no reason to employ more than about 40 moles of the modifier per mole of metal in the organometallic initiator system employed. In most cases from about 0.25 to about 15 moles of the modifier will be employed per mole of metal in the organometallic initiator system utilized. Preferably from about 0.5 to 10 moles of the modifier will be utilized per mole of lithium with from about 1 to 5 moles of the modifier per mole of lithium being most preferred.

The polymerization temperature utilized can vary over a broad range of from about −20° C. to about 150° C. In most cases a temperature within the range of about 30° C. to about 125° C. will be utilized. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered an optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymers which are made by utilizing the modifiers of this invention in solution polymerizations can be recovered utilizing conventional techniques. In many cases it will be desirable to destroy residual carbon-lithium bonds which may be present in the polymer solution and to recover the synthetic polymer produced. It may also be desirable to add additional antioxidants to the polymer solution in order to further protect the polydiene produced from potentially deleterious effects of contact with oxygen. The polymer made can be precipitated from the polymer solution and any remaining lithium moieties can be inactivated by the addition of lower alcohols, such as isopropyl alcohol, to the polymer solution. The polydiene can be recovered from the solvent and residue by means such as decantation, filtration, centrification, and the like. Steam stripping can also be utilized in order to remove volatile organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, a synthetic polyisoprene rubber was made by utilizing the techniques of this invention. In the procedure used, 1,500 grams of a silica/molecular sieve/aluminum dried premix containing 20.3 percent isoprene in hexane was charged into a one gallon (3.8 liters) reactor. After the scavenger level of 1.8 ppm, as determined, 9.7 ml of THFA-ONa (sodium salt of tetrahydrofurfuryl alcohol, 0.126M in toluene) and 1.25 ml of a 1.04M solution of n-butyl lithium (in hexane; 1.1 ml for initiation and 0.15 ml for scavenging the premix)

was added to the reactor. The molar ratio of modifier to n-butyl lithium (n-BuLi) initiator was 1.

The polymerization was allowed to proceed at 65° C. for 2 hours. The GC analysis of the residual monomers contained in the polymerization mixture indicated that the polymerization was 92 percent complete at this time. The polymerization was continued for another 60 minutes to assure 100 percent conversion. Three ml of 1M ethanol solution (in hexane) was then added to the reactor to shortstop the polymerization and polymer was removed from the reactor and stabilized with 1 phm of antioxidant. After evaporating the hexane solvent, the resulting polymer was dried in a vacuum oven at 50° C.

The polyisoprene produced was determined to have a Tg (glass transition temperature) at +3° C. It was then determined to have a microstructure which contained 31 percent 1,4-polyisoprene units, 68 percent 3,4-polyisoprene units and 14% 1,2-polyisoprene units and 18% 1,4-polyisoprene units. The Mooney viscosity (ML-4) is 62 for this polyisoprene.

EXAMPLES 2-4

The procedure described in Example 1 was utilized in these examples except that the THFA-ONa/n-BuLi ratios were changed from 1 to 0.5, 0.75 and 1.5. The Tg's and microstructures of the resulting polyisoprenes are listed in Table I.

TABLE I

| Ex. | THFA-ONa/Li Ratio | Tg (°C.) | Microstructure | | |
|---|---|---|---|---|---|
| | | | 1,2-PI | 3,4-PI | 1,4-PI |
| 1 | 1.0 | +3 | 14 | 68 | 18 |
| 2 | 0.5 | −41 | 2 | 36 | 62 |
| 3 | 0.75 | −20 | 8 | 49 | 43 |
| 4 | 1.5 | −9 | 20 | 61 | 19 |

EXAMPLE 5

The procedure described in Example 1 was utilized in this example except that 1,3-butadiene was used as the monomer. After 1 hour of polymerization time at a temperature of about 65° C., 95% of butadiene was converted to polybutadiene. The polybutadiene produced was determined to have a Tg at −37° C. It was also determined to have a microstructure which contained 25 percent 1,4-polybutadiene units and 75% 1,2-polybutadiene units.

TABLE II

| Ex. | THFA-ONa/Li Ratio | Tg (°C.) | Microstructure (%) | |
|---|---|---|---|---|
| | | | 1,2-PBd | 1,4-PBd |
| 5 | 1.0 | −37 | 75 | 25 |

EXAMPLE 6

The procedure described in Example 1 was utilized in this example except a 20/80 mixture of styrene-butadiene in hexane was used as the monomers. 95 percent of the monomers were converted to SBR after 30 minutes of polymerization time at 65° C. The SBR produced was determined to have a Tg at −23° C. It was also determined to have a microstructure which contained 22% 1,4-polybutadiene units, 59% 1,2-polybutadiene units and 19% random polystyrene units.

TABLE III

| Ex. | THFA-ONa/Li Ratio | Tg (°C.) | Microstructure (%) | | |
|---|---|---|---|---|---|
| | | | 1,2-PBd | 1,4-PBd | Sty* |
| 6 | 1.0 | −23 | 59 | 22 | 19 |

*Random

COMPARATIVE EXAMPLE 7

The procedure described in Example 1 was utilized in this example except that a conventional sodium alkoxide, sodium t-amylate (NaOAm) was used as the modifier. After about two hours polymerization time at 65° C., 84 percent of the isoprene was converted to polyisoprene. The polyisoprene produced was determined to have a Tg at −34° C. It was also determined to have a microstructure which contained 52 percent 1,4-polyisoprene units, 43 percent 3,4-polyisoprene units and 5 percent 1,2-polyisoprene units.

TABLE IV

| Ex. | NaOam/N-BuLi | Tg (°C.) | Microstructure (%) | | |
|---|---|---|---|---|---|
| | | | 1,2-PI | 3,4-PI | 1,4-PI |
| 7 | 1.0 | −34 | 5 | 43 | 52 |

COMPARATIVE EXAMPLE 8

The procedure described in Example 1 was utilized in this example except that a conventional sodium alkoxide, sodium t-amylate (NaOAm) was used as the modifier and 1,3-butadiene was used as the monomer. After 2 hours of polymerization time at a temperature of 65° C., 77 percent of butadiene was converted to polybutadiene. The polybutadiene produced was determined to have a Tg at −60° C. It was also determined to have a microstructure which contained 46 percent 1,4-polybutadiene units and 54% 1,2-polybutadiene units.

TABLE V

| Ex. | NaOAm/n-BuLi | Tg (°C.) | Microstructure (%) | |
|---|---|---|---|---|
| | | | 1,2-PBd | 1,4-PBd |
| 8 | 1.0 | −60 | 54 | 46 |

EXAMPLES 9-13

In this experiment, 300 grams of a silica/molecular sieve/aluminum dried premix containing 18.0 percent 1,3-butadiene in hexane was charged into a quart (800 ml) glass bottle. The modifier, THFA (tetrahydrofurfuryl alcohol; 1M in hexane) was then added into the bottle, followed by a n-BuLi solution (0.75M in hexane). Since THFA will react instantly with n-BuLi to form the lithium salt of THFA (THFA-OLi), the amount of n-BuLi used was always one molar quantity excess of THF-A so that there was n-BuLi available to initiate the polymerization. This was based on the fact that lithium alkoxide is not an initiator. The actual amounts of THFA and nBuLi in mmoles used are listed in Table VI. The polymerization was conducted at 65° C. in a rotating polymerization bath for 3 hours. A small amount of reaction mixture (cement) was taken out of bottle and coagulated in an ethanol/decane solution. The residual butadiene was then analyzed by a standard GC method. The percent conversions are also included in Table 2. The shortstop and antioxidant were then added to the reaction mixture. After evaporating the hexane solvent, the resulting polymer was dried in a vacuum oven at 50° C. The Tg's, microstructures and yields of the resulting polybutadienes are listed in Table VI.

TABLE VI

| Ex. | THFA (mmol) | n-BuLi (mmol) | Tg (°C.) | Microstructure (%) | | | Yield (%) |
|---|---|---|---|---|---|---|---|
| | | | | 1,2-PBd | cis-1,4-PBd | trans-1,4-PBd | |
| 9 | 0.27 | 0.54 | — | — | — | — | 0 |
| 10 | 0.54 | 0.81 | −42 | 71 | 11 | 18 | 54 |
| 11 | 0.81 | 1.08 | −43 | 70 | 12 | 18 | 87 |
| 12 | 1.35 | 1.62 | −42 | 70 | 12 | 18 | 94 |
| 13 | 2.70 | 2.97 | −44 | 69 | 12 | 19 | 99 |

EXAMPLES 14-16

The procedure described in Examples 9-13 was utilized in these examples except that isoprene was used as the monomer. The amounts of THFA and n-BuLi used are listed in Table VII and the Tg and microstructure of polyisoprene produced in Example 16 are also shown in Table VII.

TABLE VII

| Ex. | THFA (mmol) | n-BuLi (mmol) | Tg (°C.) | Microstructure (%) | | | Yield (%) |
|---|---|---|---|---|---|---|---|
| | | | | 1,2-PI | 3,4-PI | 1,4-PI | |
| 14 | 0.54 | 0.81 | — | — | — | — | 0 |
| 15 | 0.81 | 1.08 | — | — | — | — | 0 |
| 16 | 1.35 | 1.62 | −10 | 25 | 48 | 27 | 15 |

EXAMPLES 17-21

The procedure described in Examples 9-13 was utilized in these examples except that isoprene was used as the monomer and both TMEDA (N,N,N',N'-tetramethylethylenediamine) and THFA were employed as modifiers. The amounts of THFA, TMEDA and n-BuLi used are listed in Table VIII.

TABLE VIII

| Ex. | THFA (mmol) | TMEDA (mmol) | n-BuLi (mmol) | Tg (°C.) | Microstructure % | | | Yield (%) |
|---|---|---|---|---|---|---|---|---|
| | | | | | 1,2-PI | 3,4-PI | 1,4-PI | |
| 17 | 1.35 | 0 | 1.62 | −10 | 26 | 48 | 26 | 31 |
| 18 | 1.35 | 0.16 | 1.62 | −8 | 22 | 49 | 29 | 63 |
| 19 | 1.35 | 0.32 | 1.62 | −10 | 28 | 49 | 23 | 25 |
| 20 | 1.35 | 0.80 | 1.62 | −10 | 26 | 47 | 27 | 18 |
| 21 | 1.35 | 1.62 | 1.62 | −10 | 28 | 49 | 23 | 23 |

EXAMPLES 22-25

The procedure described in Examples 9-13 was utilized in these examples except that isoprene was used as the monomer and both KOAm (potassium t-amylate) and THFA were used as modifiers. The amounts of THFA, KOAm and n-BuLi used are listed in Table IX.

TABLE IX

| Ex. | THFA | KOAm | n-BuLi | Tg (°C.) | Microstructure (%) | | | Yield (%) |
|---|---|---|---|---|---|---|---|---|
| | | | | | 1,2-PI | 3,4-PI | 1,4-PI | |
| 22 | 1.35 | 0 | 1.62 | −10 | 27 | 49 | 24 | 24 |
| 23 | 1.35 | 0.16 | 1.62 | −25 | 18 | 41 | 41 | 31 |
| 24 | 1.35 | 0.80 | 1.62 | −26 | 18 | 40 | 40 | 93 |
| 25 | 1.35 | 1.62 | 1.62 | −27 | 18 | 39 | 39 | 94 |

EXAMPLES 26-30

The procedure described in Examples 9-13 was utilized in these examples except that both TMEDA (N,N,N',N'-tetramethylethylenediamine) and THFA were used as modifiers. The amounts of THFA, TMEDA and n-BuLi used are listed in Table X and the Tg's, microstructures and yields of the resulting polybutadienes are also shown in Table X.

TABLE X

| Ex. | THFA (mmol) | TMEDA (mmol) | n-BuLi (mmol) | Tg (°C.) | Microstructure (%) | | | Yield (%) |
|---|---|---|---|---|---|---|---|---|
| | | | | | 1,2-PBd | cis-1,4-PBd | trans-1,4-PBd | |
| 26 | 0.81 | 0 | 1.08 | −42 | 71 | 11 | 18 | 73 |
| 27 | 0.81 | 0.11 | 1.08 | −41 | 71 | 11 | 18 | 82 |
| 28 | 0.81 | 0.22 | 1.08 | −40 | 72 | 10 | 18 | 63 |
| 29 | 0.81 | 0.54 | 1.08 | — | — | — | — | 0 |
| 30 | 0.81 | 1.08 | 1.08 | — | — | — | — | 0 |

EXAMPLES 31-35

The procedure described in Example 9-13 was utilized in these examples except that both KOAm (potassium t-amylate) and THFA were used as modifiers. The amounts of THFA, KOAm and n-BuLi used are listed in Table XI and the Tg's, microstructures and yields of the resulting polybutadienes are also shown in Table XI.

TABLE XI

| Ex. | THFA (mmol) | KOAm (mmol) | n-BuLi (mmol) | Tg (°C.) | Microstructure (%) | | | Yield (%) |
|---|---|---|---|---|---|---|---|---|
| | | | | | 1,2-PBd | cis-1,4-PBd | trans-1,4 PBd | |
| 31 | 0.81 | 0 | 1.08 | −42 | 69 | 12 | 19 | 93 |
| 32 | 0.81 | 0.11 | 1.08 | −65 | 48 | 21 | 31 | 100 |
| 33 | 0.81 | 0.22 | 1.08 | −66 | 47 | 20 | 33 | 100 |
| 34 | 0.81 | 0.54 | 1.08 | −67 | 43 | 20 | 37 | 100 |
| 35 | 0.81 | 1.08 | 1.08 | −66 | 43 | 17 | 39 | 100 |

COMPARATIVE EXAMPLES 36-42

The procedure described in Examples 9-13 was utilized in these examples except that isoprene was used as the monomer and KOAm (potassium t-amylate) was used as the modifier. The amounts of KOAm, n-BuLi and KOAm/n-BuLi ratios used are listed in Table XII. The Tg's, microstructures and yields of the resulting polyisoprenes are also listed in Table XII.

TABLE XII

| Ex. | KOAm (mmol) | n-BuLi (mmol) | KOAm/ n-BuLi | Tg (°C.) | Microstructure (%) | | |
|---|---|---|---|---|---|---|---|
| | | | | | 1,2-PI | 3,4-PI | 1,4-PI |
| 36 | 0 | 0.27 | 0 | −63 | 0 | 7 | 93 |
| 37 | 0.03 | 0.27 | 0.1 | −63 | 0 | 7 | 93 |
| 38 | 0.07 | 0.27 | 0.25 | −62 | 0 | 8 | 92 |
| 39 | 0.14 | 0.27 | 0.5 | −61 | 0 | 11 | 89 |
| 40 | 0.27 | 0.27 | 1.0 | −43 | 6 | 30 | 64 |
| 41 | 0.41 | 0.27 | 1.5 | −42 | 6 | 32 | 62 |
| 42 | 0.54 | 0.27 | 2.0 | −41 | 5 | 33 | 62 |

EXAMPLES 43-46

The procedure described in Examples 9-13 was utilized in these examples except that isoprene was used as the monomer and THFA-OLi (lithium salt of THFA) was used as the modifier. The amounts of THFA-OLi, n-BuLi and THFA-OLi/n-BuLi ratios used are listed in Table XIII. The Tg's, microstructures and yields of the resulting polyisoprenes are also listed in Table XIII.

TABLE XIII

| Ex. | THFA-OLi (mmol) | n-BuLi (mmol) | THFA-OLi/Li Ratio | Tg (°C.) | Yield % |
|---|---|---|---|---|---|
| 43 | 0.27 | 0.27 | 1 | −44 | 16 |
| 44 | 0.81 | 0.27 | 3 | −10 | 20 |
| 45 | 1.35 | 0.27 | 5 | −13 | 22 |
| 46 | 2.70 | 0.27 | 10 | −11 | 21 |

EXAMPLES 47-51

The procedure described in Examples 9-13 was utilized in these examples except that THFA-OLi (lithium salt of THFA) was used as the modifier. The amounts of THFA-OLi, n-BuLi and THFA-OLi/n-BuLi ratios used are listed in Table XIV. The Tg's and yields of the resulting polybutadienes are also listed in Table XIV.

TABLE XIV

| Ex. | THFA-OLi (mmol) | n-BuLi (mmol) | THFA-OLi/Li Ratio | Tg (°C.) | Yield % |
|---|---|---|---|---|---|
| 47 | 0.27 | 0.27 | 1 | −96 | 63 |
| 48 | 0.81 | 0.27 | 3 | −36 | 89 |
| 49 | 1.35 | 0.27 | 5 | −33 | 75 |
| 50 | 2.70 | 0.27 | 10 | −40 | 54 |

It has been unexpectedly found that yields can sometimes be greatly increased by conducting the polymerization in the presence of a conventional polar modifier. In such cases the polymerization is carried out in the presence of both a conventional polar modifier and the salt of a tetrahydrofurfuryl alcohol. Ethers and tertiary amines which act as Lewis bases can be utilized as the conventional polar modifier. Some representative examples of specific conventional polar modifiers which can be utilized for such a purpose include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, potassium t-amylate, N-phenyl morpholine, 1,2,3-trialkoxybenzenes and 1,2,4-trialkoxybenzenes. As a general rule it is preferred to employ N,N,N',N'-tetramethylethylenediamine or potassium t-amylate to improve yields.

Table IX shows the dramatic increase in yields which was obtained by conducting the polymerizations in the presence of increasing amounts of potassium t-amylate. In Example 22 no potassium t-amylate was present and the yield attained was only 24%. However, as increasing amounts of potassium t-amylate was added, yields increased to 94% in Example 25 where 1.62 mmol of potassium t-amylate was employed.

While certain representative embodiments and details have been shown for the purpose of illustrating the subject invention, it will be apparent to those skilled in this art that various changes and modifications can be made therein without departing from the scope of the subject invention.

What is claimed is:

1. A catalyst system which is particularly useful in the anionic polymerization of conjugated diene monomers into polydiene polymers having high vinyl contents which consists essentially of (a) an initiator which is selected from the group consisting of organolithium compounds, organosodium compounds, organopotassium compounds, and oranomagnesium compounds, and (b) a modifier having the structural formula:

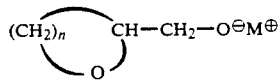

wherein n represents the integer 3 and wherein M represents a metal selected from the group consisting of lithium, potassium, rubidium, and cesium.

2. A catalyst system as specified in claim 1 wherein the initiator is an organolithium compound.

3. A catalyst system as specified in claim 2 wherein M represents a metal selected from the group consisting of lithium and potassium.

4. A catalyst system as specified in claim 3 wherein M represents lithium.

5. A catalyst system as specified in claim 4 wherein the molar ratio of modifier to lithium initiator is within the range of about 0.1:1 to about 40:1.

6. A catalyst system as specified in claim 4 wherein the molar ratio of modifier to lithium initiator is within the range of about 0.25:1 to about 15:1.

7. A catalyst system as specified in claim 6 wherein the molar ratio of modifier to lithium initiator is within the range of about 0.5:1 to about 10:1.

8. A catalyst system as specified in claim 7 wherein the initiator is an alkyl lithium compound.

9. A catalyst system as specified in claim 7 wherein the initiator is n-butyl lithium.

10. A catalyst system as specified in claim 9 wherein the molar ratio of modifier to lithium initiator is within the range of about 1:1 to about 5:1.

* * * * *